United States Patent [19]
Hayes et al.

[11] Patent Number: 5,282,236
[45] Date of Patent: Jan. 25, 1994

[54] SELF-TESTING MECHANISM DETERMINING X-RAY EXPOSURE

[76] Inventors: Dennis D. Hayes, 1826 W. Jenner, Lancaster, Calif. 93534; Warren W. Welcome, 3411 S Camino Secco #95, Tucson, Ariz. 85730

[21] Appl. No.: 864,546

[22] Filed: Apr. 7, 1992

[51] Int. Cl.$^5$ ............................................. H05G 1/28
[52] U.S. Cl. .................................. 378/182; 378/162; 378/165
[58] Field of Search ............... 378/182, 183, 185, 187, 378/97, 162, 108, 165

[56] References Cited

U.S. PATENT DOCUMENTS

| | | | |
|---|---|---|---|
| 3,703,272 | 11/1972 | Lareau | 378/187 |
| 4,248,172 | 2/1981 | Kröbel et al. | 378/182 |
| 4,394,772 | 7/1983 | Okamoto et al. | 378/182 |
| 4,679,217 | 7/1987 | Fairchild | 378/97 |
| 4,739,168 | 4/1988 | Aoki | 378/97 |
| 4,903,288 | 2/1990 | McAllister | 378/182 |

FOREIGN PATENT DOCUMENTS 0146246  9/1982  Japan ................................ 378/182

Primary Examiner—David P. Porta
Attorney, Agent, or Firm—Frank L. Zugelter

[57] ABSTRACT

A mechanism/device (29) in association with a radiographic cassette (20) in which X-ray film (28) or the like is exposed. Upon exposure, an LED (39) continually blinks, indicating exposure to the user, thereby obviating double exposure of the film. A test and reset circuit (80) informs the user at any time of the operational status of device (29). Device (29) comprises a sensor (30), a photodiode (47), a conduit formed by a bundle (31) of optical fibers which conveys light energy from sensor (30) to photodiode (47) that converts it into an electrical current controlled by an electronic circuit (35) which includes LED (39). Circuit (35) includes a detecting and amplifying circuit (51), an oscillating circuit (68), a latching circuit (65) for maintaining blinking of LED (39), and the test-and-reset circuit (80).

24 Claims, 3 Drawing Sheets

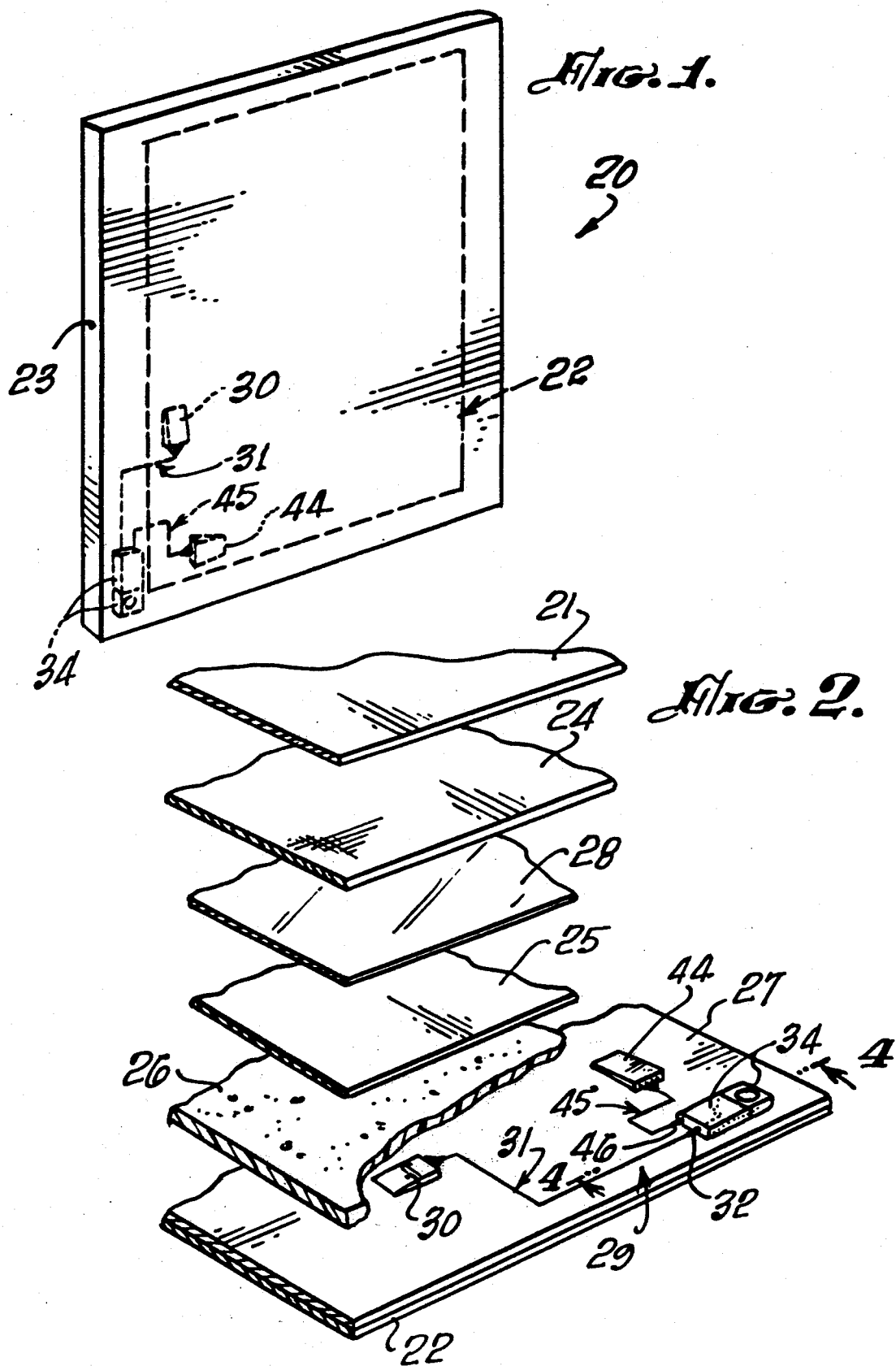

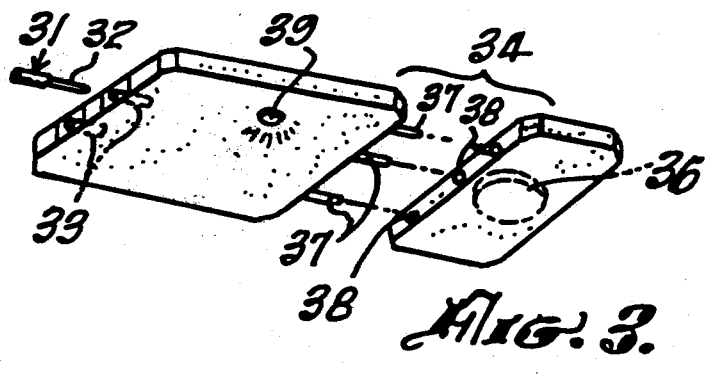
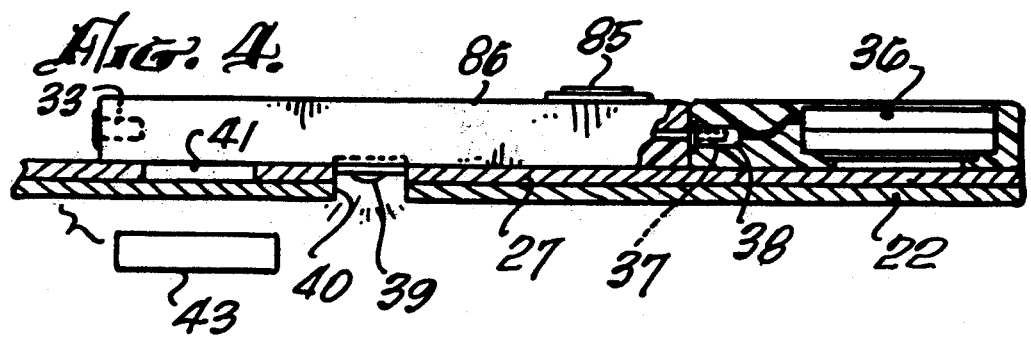
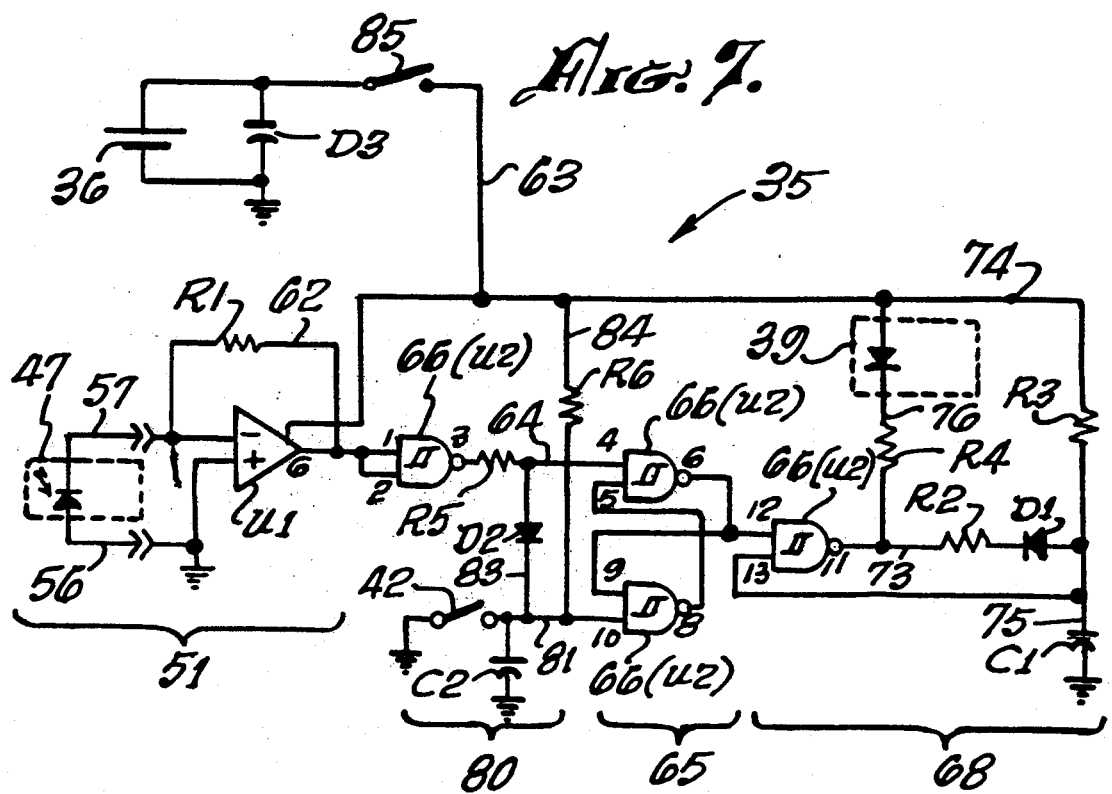

SELF-TESTING MECHANISM DETERMINING X-RAY EXPOSURE

TECHNICAL FIELD

This invention relates to radiographic or X-ray film cassettes, and more particularly to a mechanism or device that indicates that an X-ray film in a cassette has been exposed, without opening the cassette, to an electronic system in the mechanism which includes means for determining the operational status of the device at any time as well as before or after such exposure, and to an assembly that transmutes a radiographic pulse to a light sensor whose energy thence is conveyed by novel means to an electronic circuit responsive to a current generated by a photodiode or the light sensor itself.

BACKGROUND ART

Prior art teachings the disclosures of which go to X-ray film cassettes are U.S. Pat. Nos. 3,703,272; 4,248,172; 4,394,772, and 4,903,288, hereby made of record. Okamato '772 discloses a cassette with a visual check to indicate whether it is loaded or unloaded. McAllister '288 qualifiedly discloses a cassette which when empty is suppose to show a blank indicator, with an X-ray film in it and not exposed is suppose to show a "spot" which indicates presence of film, and with the X-ray film in the cassette in an exposed condition is suppose to show an altered display locked onto the indicator by means of a latching circuit supposed to be energized by reason of a signal from a photocell accepting a light sensor's pulse. However, McAllister '288 does not disclose specific electronic or latching circuits, a means to test whether his device is or is not operational, or optical fiber conduit(s) between sensor and photodiode/electronic circuit.

PROBLEMS IN THE ART

There is always a problem, going to costs, time and labor, attributable directly to losing unexposed and/or double exposed X-ray film which becomes exposed in use or by opening its cassette. It is exposed or unexposed? This has been the age-old dilemna with X-ray film cassettes. Also, for other reasons, a technician's only recourse in present X-ray practice is to run X-ray film through a processor in order to determine if it has been used (exposed). The result many times is a wasted film that had never been exposed until then; or double exposed, this also in turn increasing costs.

Another problem or disadvantage generated by the uncertainty of the condition of an X-ray film in a cassette is the direct effect it has on the person being X-rayed, as there is no threshold dose for exposure to ionizing radiation, thus providing for an element of risk to the health of the patient. The patient again must undergo an X-ray of his condition, thus increasing a risk of health to the patient.

This invention substantially eliminates or minimizes these noted problems and disadvantages.

SUMMARY OF THE INVENTION

The invention comprises one or more light sensors, one or more conduits of light and an electronic device housed in a cassette and which upon an external visual inspection of a flashing element therein provides the necessary knowledge to the user whether the film is or is not exposed, or whether the mechanism is or is not operational, thus eliminating the need for chemical development by means of a processor and the associated undesired waste of film.

Each sensor includes a small wafer of highly efficient rare-earth phosphor on a substrate combined with a second like-sized wafer, they being sandwiched together to cause the following effect.

When an X-ray or radiographic beam strikes the wafer assembly of the rare-earth phosphor, it is excited, and the beam's energy is transmuted into visible light energy by the sensor. The visible light is routed via a conduit formed by optical fibers into a photodiode which converts it into an electrical signal. An electronic circuit responds to the signal so as to provide a corresponding visible signal which then is read by a technician. This visible signal takes the form of a flashing LED (light-emitting diode). The circuit proper is constructed as well to provide for testing its operation, through the same LED, as well as providing for automatic set and reset-for-use features after exposure, or otherwise indicating the cassette is ready for use. In other words, the technician is able to make sure the device is working, before, during and after film has been inserted into the cassette, and yet will not be obliged to prime the device (to see if it works) by inserting an X-ray film in it for exposure operation. The invention is powered by a 3-volt cell which has a life expectancy of 1-and-½ to 2 years under normal and consistent use, and can be replaced with relative ease when necessary.

An advantage of the invention is that the operational status of its circuit, power supply (battery) and components can be immediately determined in each cassette, irrespective of the frequency or infrequency of use of the particular cassette being tested. It is known in practice that some radiographic (X-ray, primarily) cassettes are used more or less frequently than others, and this invention removes doubt on the condition or status of X-ray film in such cassettes, regardless of frequency or non-frequency of use of such cassettes. Also, the invention provides ease of change of the power supply/battery without interfering with the position or location of the circuit or one or more sensors. Further, the form of the battery's encasement in relation to the circuit's encasement eliminates the possibility of an improper polarity alignment which otherwise would negate the function of the invention or damage its circuit. Another advantage is the extremely low profile of the encasements of the mechanism and its battery. Also, the battery is easily placed in its encasement within an X-ray film cassette without the necessity of removing or displacing any of the latter's or mechanism's parts. By virtue of its extremely thin profile and its high degree of sensitivity, the invention can be integrated within the framework of any cassette without invading or disturbing the film or scintillating screens before or after exposure to an X-ray beam. The protecting resin encasements maintain the invention's integrity by shielding it from shock and from fluids such as, for example, blood and screen cleaners.

An object of this invention is to provide a beneficial impact towards containment of or reduction in health care costs.

A further object of the invention is to absolutely minimize the risk to the health of a patient in the application of radiographic or X-ray energy to the patient for a determination of the patient's health, by effectively eliminating two-time exposure to the patient.

Another object of the invention is to provide knowledge to the cassette's user of the condition (exposed or unexposed) of the film in the cassette, without undesirably wasting unexposed film by developing the film or otherwise using the cassette.

A further object of this invention is to conserve the battery's energy/power when the cassette is not closed.

A still further object of this invention is to indicate that there is exposed radiographic or X-ray film in its cassette without opening it, thereby eliminating the necessity of determining the uncertainty of the possibility of unexposed film in the cassette, the knowledge of unexposed film heretofore determined by its chemical development.

A further object of the invention is to provide a visible signal that the device is operational or not operational.

Another object of this invention is to determine whether or not a cassette with film in it has been exposed to ionizing radiation without having to utilize a film processor.

Another object of the invention is to be able to test for the operational status of a cassette prior to, during, and after installation in it of a radiographic film.

A further object of the invention is the employment in a radiographic cassette of a device that indicates film exposure and operational status of the device itself.

These and other objects and advantages will become more apparent by a full and complete reading of the following description, appended claims thereto, and the accompanying drawing comprising three (3) sheets of seven (7) FIGURES.

BRIEF DESCRIPTION OF THE DRAWING

FIG. 1 is a perspective view of a conventional cassette and in which the invention is incorporated.

FIG. 2 is an exploded fragmentary view of subject matter incorporating the invention.

FIG. 3 is an underside perspective view of components included within the subject matter of the invention.

FIG. 4 is a view partly in section and partly cut away, taken on line 4—4 of FIG. 2, but somewhat modified.

FIG. 7 is a schematic diagram of the electronic circuit included within the subject matter of this invention.

BEST MODE FOR CARRYING OUT THE INVENTION

Figure 5:
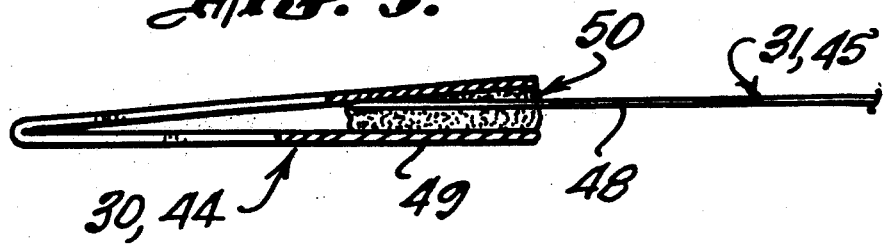
FIGS. 5 and 6 are schematic illustrations of X-ray pulse sensors and optical fiber conduits utilized in the invention.

Referring now to the drawing wherein reference characters correspond to like numerals hereinafter, FIGS. 1 and 2 illustrate a conventional cassette 20, modified by this improvement thereto. Cassette 20 is of the types disclosed in U.S. Pat. Nos. 3,703,272 and 4,394,772. Prior art teachings will be described only, if necessary, to an extent providing for an understanding of the present invention which is readily adaptable to such disclosed cassettes, others, and other instruments as well.

FIG. 1 illustrates the cassette 20 in a schematic perspective, and FIG. 2 illustrates an exploded fragmentary perspective view of such cassette, both including illustration of subject matter of the invention. Cassette 20 comprises a pair of metal covers 21, 22 which are conventionally hinged (not shown) along the cassette's side edge 23, a first scintillating screen 24, FIG. 2, formed of calcium tungstate or of materials that are of current standard and utilized for scintillating screen purposes in X-ray cassettes, and which screen 24 is suitably adhered to the interior surface of metal cover 21, a second scintillating screen 25 suitably adhering to the top of a thickness of suitable foam material 26, spongy in nature, which in turn is suitably adhered or otherwise securely mounted upon a lead foil sheet or membrane 27 which in turn is suitably adhered to metal cover 22.

An X-ray film 28 is insertable between screens 24 and 25 for X-ray purposes, usually medical in nature. These described elements constitute prior art teaching.

The mechanism or device 29 of the invention comprises a sensor 30, FIG. 2, securely mounted on the top of the sheet constituting lead foil 27, a bundle of optical fibers 31 connected to sensor 30 and which bundle extends to a connector 32, which connector 32 in turn is attached, via a suitable socket 33, FIGS. 3, 4, in the one encasement 34, to a circuit 35, FIG. 7, contained within one of the two suitable circuit board plastic encasements 34, FIGS. 2, 3, 4, which are attached to lead foil 27, or otherwise held firm in position by foam material 26. A battery 36 is installed in the second of the two encasements 34 which is contiguous to the first of the encasements. It provides power for the operation of the electronic circuit 35 through unequally-distanced prongs 37 which frictionally engage their corresponding bores 38 which make suitable electrical contact with their appropriate components of circuit 35. Circuit 35 includes a light-emitting diode (LED) 39, FIGS. 3, 4, 7, the flashing of which constitutes a visible signal to the technician or user in the operation of the invention. A suitable hole 40, FIG. 4, is formed in cover 22 and foil 27 so that LED 39 is visible to its observer as to its flashing or not, and the positioning of the first of encasements 34 in cassette 20 determines the location of hole 40 in cover 22.

A small areal portion of lead foil 27 is scratched off or otherwise omitted or eliminated as at 41, FIG. 4, so that in the securement of the first of the encasements 34 to or upon or over the foil 27, a particular switch 42, FIG. 7, in circuit 35 is in disposition or otherwise overlies such omitted portion 41 for actuation by a hand-held magnet 43, FIG. 4, used in an operation of the invention. The switch 42 is conveniently disposed within the one encasement 34, adjacent the omitted portion 41 of foil 27. Thus, in operation of the invention, and as described more fully below, with cassette 20 closed, switch 42 may be closed, by placing magnet 43 in close proximity to the omitted portion 41, to thereby cooperatively act with switch 42 to close it and thus to test the circuit 35 to determine whether it is functioning properly. Such a check of functionality can be performed irrespective of whether an X-ray film 28 is or is not in an opened or closed cassette, although in most instances, this check would be performed with a film in a closed cassette. A mechanically-actuated switch may replace switch 42 if desired.

FIGS. 1 and 2 also illustrate the utilization of a second sensor 44, should this be preferred in an embodiment. An optical fiber bundle 45 attached to sensor 44 is attached to a connector 46 which in turn is inserted and installed in its own socket 33 (see second socket 33 in FIG. 3). One or both connectors 32, 46 are optically coupled to a photodiode or photodetector 47, FIG. 7, of circuit 35.

Figure 6:
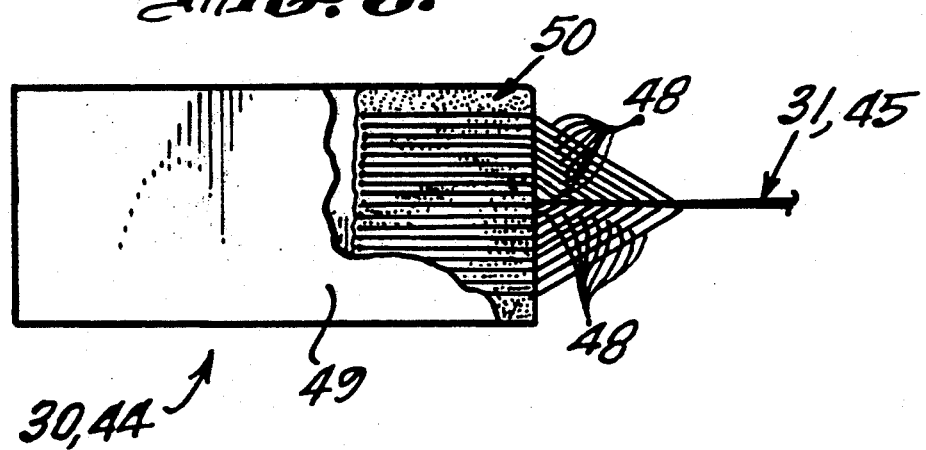

FIGS. 5, 6 schematically illustrate that each of sensors 30, 44 is attached to a plurality of strands 48 of optical fibers which are wound together to form their bundles 31, 45 of optical fibers utilized in the subject matter of this invention. Each bundle 31, 45 constitutes a corresponding conduit for conveying light and its energy from sensors 30, 44 to photodiode 47.

When two sensors 30, 44 are included in an embodiment of the invention, they are suitably distanced from one another and preferably oriented at right angles to one another in cassette 20 to provide a lower incidence of non-sensed exposure due to collimation (adjustment of the field of exposure to the patient) of the part of the person being studied.

It should be understood that fiber bundle 45 may be joined directly to fiber bundle 31 to thereby form a single cable and conduit, in the event it is desired to have but one connector 32 (or 46) in an embodiment, vis-a-vis having two connectors 32, 46 as illustrated in the FIGURES.

Each of these sensors 30, 44, FIGS. 5, 6, is formed in a thin wedge-like configuration 49, FIG. 5, the stub 50 of which includes a sufficient thickness from which its corresponding strands 48 of optical fibers eminate and which are wound into a corresponding fiber bundle.

The light captured from one or both such sensors is determined by the number of optical fibers in their corresponding bundle as well as by the light falling within a required angle for transmission of light into its corresponding bundle. The bundling of a greater plurality of fiber strands provides a greater intensity of light per unit area, thereby reducing the need for a large photodiode 47 in circuit 35, thus reducing over-all cost while increasing overall efficiency in the operation of the invention.

X-ray energy striking screens 24, 25 causes them to generate light which affects the photographic film to make the x-ray picture. The remaining energy which has passed through screens 24, 25 and which strikes the rare earth phosphors in sensors 30, 44 causes them (30,44) to generate light which is transmitted through fiber bundles 31, 45 to the photo-detector. It is this light which is captured, and the captured light within the angle of transmission for each bundled number of optical fibers is conveyed to a connector 32, 46 through the conduit formed by each bundle.

Referring now to FIG. 7, an X-ray pulse initiates, via the scintillating materials and light conveyance via the sensors to the optical fiber bundles and to and through connectors 32, 46, the actuation in circuit 35 of a detector/amplifier circuit 51 operatively connected to the photodiode 47. Connectors 32, 46 are conventionally attached to photodiode 47 within the first of the two encasements 34, as at sockets 33, FIGS. 3 and 4. Sensors 30, 44 accept light from the scintillators 24, 25, and it is this light which is transmitted or conveyed and then converted into an electrical current by photodiode 47, and then detected and amplified in circuit 51. Either or both sensors 30, 44 can be placed in the cassette anywhere, as no electrical signal is generated until the transmitted or conveyed light strikes photodiode 47.

Photodiode 47 is connected by an electrical line 56 to ground and by a line 57 to an operational amplifier U1, the photodiode 47 and amplifier U1 forming the circuit 51. Circuit 51 itself does not, of course, detect X-ray energy directly. Each cassette contains the screens or sheets 24, 25 of "scintillator" material which emits visible light in response to the energy expelled by an X-ray or radiographic beam. This light is conveyed along the one or more conduits formed by bundles 31, 45 to photodiode 47 which converts it into an electrical current in line 57 in proportion to the light energy falling on it. The current in line 57 is converted to a voltage signal at pin 6 of amplifier U1. A line 62 includes a resister R1 which assists amplifier U1 to convert current in line 57 to a desired voltage signal. A line 63 connects battery 36, the power source for the entire circuit, to the amplifier U1 and provides power that energizes the operational amplifier U1. The voltage signal from amplifier U1 is transmitted through a line 64 to a latch/memory circuit 65.

However, a NAND gate module 66 is inserted in line 64, and comprises a Schmitt trigger (known in the art) and hysteresis features. The Schmitt trigger characteristic of this particular NAND gate module 66 says that the input voltage can rise gradually with no change in the output voltage until the input voltage reaches a particular level, called the high threshold, at which point the output voltage makes a full transition from high to low. A similar action takes place as the input voltage is lowered until it reaches a low threshold, at which point the output voltage makes a full transition from low to high. The additional characteristic, hysteresis, is provided by making the high threshold higher than the low threshold. These Schmitt and hysteresis characteristics are built into industry-standard packages of gate modules, four of such gates 66 being commonly purchased in a single package. The Schmitt trigger and hysteresis features are required in the NAND gate module 66 which includes gate U2-3, FIG. 7, and they buffer the amplifier's output voltage. Such features also are required in the gate U2-11 in a module 66 for an oscillator 68 that controls the flashing of the LED 39, FIGS. 7 and 4, visually observable by the user or technician. It should be understood that these features are not required in the other two gates, U2-6 and U2-8 (which do function, as described below), which are included in circuit 34 as a result of being included in the commercial package of four modules 66. These features in the gate modules 66 identified in FIG. 7 by gates U2-6 and U2-8 do not cause any problem in the overall functioning of the circuit 35.

Concerning the latch-memory circuit 65, the cross-coupled gates U2-6 and U2-8 form a memory latch whose function is to remember that the entire system operative in the invention has been reset until an X-ray pulse is received, after which X-ray pulse being received, the circuit 65 remembers that it has been set until it receives a reset signal. This memory circuit 65 functions as follows.

With voltages at pins 4 and 10 being the set and reset input voltages, respectively, with such input voltages most of the time being high, the latch holds itself in a given state by the cross-coupling connections between the two input NAND gates U2-6 and U2-8. For example, when circuit 65 is reset, the voltage output at pin 6 is low, forcing the voltage output at pin 8 high because the pin 6 voltage is tied to input voltage at pin 9. Pin 8 voltage in turn is tied to input voltage at pin 5 and the high voltage levels on both pins 5 and 4 hold output voltage at pin 6 low. When a current established by an X-ray pulse is received in the circuit, pin 4 voltage is lowered momentarily, perhaps for only a few microseconds, however during this time, output voltage pin 6 is raised. The high voltage levels on both pins 9 and 10 cause output voltage at pin 8 to go low, which in turn drives input voltage at pin 5 low, trapping the new state by holding output voltage at pin 6 high even after input voltage at pin 4 returns to a high level. Conversely, by momentarily lowering the input voltage at pin 10 will cause the latch circuit to return to the reset state by a sequence like that just described, and to hold that state after the voltage at pin 10 has returned to a high level. This cross-coupled latching circuit is known in the art.

The oscillator/flasher circuit 68 includes the light emitting diode (LED)39 which is externally visible on the cassette to the technician, and comprises the Schmitt trigger gate U2-11 plus the resistors R2, R3, diode D1 and capacitor C1 in lines 73, 74, and 75. In the normal flashing of LED 39, the voltage at pin 12 is high and capacitor C1 is charged from battery 36 through resistor R3, causing the voltage at pin 13 to rise. When pin 13 voltage reaches the upper Schmitt trigger threshold, output pin 11 voltage switches to its low level (near zero volts), discharging capacitor C1 through diode D1, resistor R2 and the gate pin 11 output transistor. During the discharge of capacitor C1, current passes through LED 39 (giving a visible light emission) in a line 76 with a resistor R4 therein to the output transistor in gate U2-11. As capacitor C1 discharges, it lowers the voltage at input pin 13, and on such voltage reaching the lower Schmitt trigger threshold, the output voltage at pin 11 switches to its high logic level. This stops the light output voltage and reverses the bias voltage on diode D1, allowing capacitor C1 to start a new charging cycle. This cycling action continues while gate input voltage at pin 12 is high, but when pin 12 voltage is low, oscillations are blocked and LED 39 does not flash.

After exposure of film in a closed cassette 20 in a usual manner, such as through a patient, as a result of the effect of an X-ray pulse entering the film in the cassette, LED 39 will flash at a low rate until the circuit is reset. LED 39 flashes when voltage at pin 12 is high, and this flashing of LED 39 will mean to the technician that X-ray film in the cassette has been exposed.

A test/reset circuit 80 is included in circuitry 35, and includes open switch 42 in its line to ground, a reset input line 81 connected to pin 10 of the U2-8 module, capacitor C2 in its own line to ground, a diode D2 in a line 83, and resistors R5 and R6 in lines 64 and 84, respectively. In the context of this invention, reset of the circuit means that LED 39 does not flash, but the circuit is alive and ready to function when photodiode 47 signals to it that an X-ray pulse was sensed. The circuit's capability of operation can be verified (tested) by pressing or closing switch 42. LED 39 will flash while switch 42 is closed, and when switch 42 is released (by removal of magnet 43) so that it opens, the circuit 80 assures that it is reset. The reset circuit including switch 42 functions as follows. When 42 is closed, the latch reset input voltage at pin 10 is lowered directly and capacitor C2 is discharged, while the set input voltage at pin 4 is lowered through diode D2. This is done to force latch output voltage at pin 6 high, thus raising the input voltage at pin 12 of U2-11, causing oscillator 68 to run, and thus LED 39 to blinkingly flash. When switch 42 is opened, latch input voltages at pins 4 and 10 rise, but voltage at pin 4 rises more rapidly, since the voltage at pin 10 is delayed while the capacitor C2 is charged through R6. Delaying the rise of voltage at pin 10 assures that the latch will assume and retain the reset state. The resistor R5 provides the condition for the lowering of voltage at pin 4 through diode D2 while the voltage at pin 3 remains high. When cassette 20 is opened and a switch 85 in the battery's line 63 is thereby opened, battery power is removed from the circuit (thus, conserving energy) and capacitor C2 becomes discharged. When power is applied (as switch 85 is closed when the cassette is closed) both latch input voltages rise but input voltage to pin 10 is again delayed while capacitor C2 charges, and the reset state of the latch is assured, as before. When the output of gate U2-3 is lowered due to an X-ray pulse, diode D2 becomes back-biased and the set input voltage of the latch at pin 4 is effectively disconnected from the remainder of the reset circuit. Thus, the set signal reaches the set input pin 4 voltage unencumbered.

The gate U2-3 buffers the set signal, as mentioned earlier. The Schmitt trigger input provides a guard against any low level noise which might be picked up. That is, the buffer does not respond until the signal reaches the high threshold, but when it does respond, its output is an unambiguous logic level signal. This design assures that circuit 35 is always in a reset state immediately after the application of power through the closing of switch 85.

Switch 85, FIG. 7, is externally accessible, and is mounted on a wall 86, FIG. 4, opposing the one encasement 34's wall contiguous to omitted portion 40. Switch 85 is actuated into closed position by the effect of pressure on foam 26 on it when the cassette's covers 21 and 22 are closed, thereby applying power from battery 36 to circuit 35 whenever the cassette remains closed. Thus, a second method for resetting latch circuit 65 in circuit 35 is to open and close the cassette 20, as occurs when it is to be loaded with a fresh sheet of radiographic or X-ray film.

The test/reset circuit 80 provides several purposes or functions:

1) it tests the oscillator 68 while switch 42 is closed, to determine whether it is flashing (operational or not); this test occurs with or without film in cassette 20 while switch 42 is closed.

2) it assures that after switch 42 is open, the latch/memory circuit 65 remains in a reset state.

3) it assures that when power is first applied, that is, with battery switch 85 closed, latch circuit 65 is in the reset state.

4) the set signal obtained from a voltage pulse is accepted and remembered by circuit 35, which then applies an enabling voltage to the oscillator.

In operation, in the event a user desires to know if mechanism 29 is operational, i.e., is working properly, the user hand-holds magnet 43 in proximity to or over the omitted portion 41 of foil 27, adjacent cover 22, while the cassette is closed. This disposition of magnet 43 causes switch 42 to close, thus energizing the oscillator 68 to flash should circuit 35 be functional as a result of a good battery 36. Should the LED 39 not flash, then battery 36 first should be replaced with a good one and of course, if LED 39 again does not flash, circuit 35 should be checked out, or more simply, either or both encasements 34 may be readily replaced with preassembled operational units.

It also is possible to check the cassette's operational status when it is open, by manually closing switch 85 (applying finger pressure to foam 26 over the switch) and then using magnet 43 and switch 42.

After an unexposed film 28 is installed in cassette 20 and the latter then closed, the question later arises, when the closed cassette is brought to the attention of a user or technician who did not immediately or some-time thereafter close it, whether the film is unexposed (so that the cassette and film can be applied to a patient) or exposed (thus, knowing that film has already been exposed, and thus not for use a second time on a patient or for otherwise processing). Now should LED 39 be flashing at such later time, the user knows that the film has been exposed and accordingly processes the cassette and its film. Should LED 39 not be flashing, the magnetically operated switch 42 is utilized to assure that circuit 35 is functional. The technician then can utilize the cassette upon a patient. In the event in the subsequent processing of the cassette and its (presumed) film, that there was in fact no film in the cassette, then, of course, the patient would be X-rayed again. However, this event or situation is so rare that it is not considered a problem in actual practice.

In assembly, after both encasements 34 with their contained components have been produced, the encasements are connected by prongs 37 and bores 38 and adhered to foil 27 or foam material 26, as the case may be, by suitable adhesive, after omitted portion 41 has been formed in foil 27. Either or both sensors 30, 44 and its/their attached fiber bundles 31, 45 are assembled to the corresponding connectors 32, 46, and mounted adheringly to foil 27. Connectors 32, 46 remain free of foil 27 in order for attachment to photodiode 47 in conventional fashion. A battery 36 is inserted into the space provided in its encasement. In the event one or both encasements and their contained elements were to become defective so as to prohibit an operational status, they, and possibly along with a new foil 27 and/or foam material 26, are applied to cassette 20. Sensors 30, 44, bundles 31, 45 and connectors 32, 46 likewise are readily replaceable in similar fashion upon defects arising.

Exemplary circuit components for the FIG. 7 schematic are as follows:

| R1 5% 10 M ohms | battery | 35 | 3V Duracell |
|---|---|---|---|
| R2 5% 300 K | photodiode | 47 | VTS3076 |
| R3 5% 10 M | diode | D1 | MMBD914T |
| R4 5% 680 | diode | D2 | MMBD914T |
| R5 5% 10 K | | | |
| R6 5% 10 M | amplifer U1 | | TLC251DC |
| | module U2 | | 74HC132AD |
| C1 0.47 m farad | LED | 39 | L311DR |
| C2 .001 | | | |
| C3 0.1 m farad | | | |

The inventive concept embraces a sensor formed of a rare-earth phosphor material that is coated with either a potassium or cesium compound which carries the unique property of converting light energy directly to an electrical current. Thus, the need for a photo-diode and the bundled fibers are eliminated. In so doing, the anode and cathode of the photodiode are repositioned onto the rare-earth phosphor material substrate.

The described electronic components are known in the arts and their described circuit is produced in accordance with state of the art techniques. X-ray cassettes likewise are state of the art.

Rare-earth phosphor formulations in present use in scintillating screens are known in the art, however, the materials used can be combinations of phosphors made as well from the yttrium, gadolidium or lanthanam series of elements. Elements 49,50 may be composed of a rubber-like material which provides the means to support individual optical fibers as they enter the sensing device proper. A material such as adhesive silicon rubber serves to keep the fibers from crossing over one another, to keep them at a proper height for maximum capture of light within the angle of transmission for an optical fiber, and serves to provide walls for the three open sides produced when the rare-earth materials are sandwiched together to form the angled area of light capture.

The inventive concept contemplates various changes and modifications within its spirit and scope without departing therefrom.

We claim:

1. An improvement for a cassette housing a radiographic film and which includes an electronic device that is actuated upon establishment and conveyance thereto of a pulse from a radiographic beam or the like, said device including means for making operational said device by the closing of the cassette and means for indicating an exposed condition of such film with the cassette closed, the improvement comprising means for testing the operational status of the device.

2. The improvement of claim 1 wherein said electronic device includes an oscillating means, said means for making operational said device comprises a first switch, and said means for testing the operational status of the device comprises a second switch for energizing said oscillating means.

3. The improvement of claim 2 including means for causing said second switch to close.

4. The improvement of claim 3 wherein said causing means is a magnet cooperating with said second switch.

5. The improvement of claim 2 wherein said indicating means comprises a light-emitting diode.

6. The improvement of claim 5 wherein the light-emitting diode used as said indicating means is included as part of said testing means.

7. A mechanism for employment in a radiographic cassette whereby an X-ray film or the like in the cassette is indicated to be exposed, comprising
 a transmuting means and an electronic circuit operatively connected thereto, said circuit including means for indicating exposure of the film or the like,
 said electronic circuit comprising
  a) detector and amplifying means for the electrical current,
  b) a light-emitting diode for indicating exposure of the film or the like, and
  c) latching means by which said light-emitting diode continues to be activated, and
 means in said electronic means for testing the operational status of the electronic means.

8. The cassette of claim 7 wherein said light-emitting diode tests the operational status of the device as well.

9. The mechanism of claim 7 wherein said electronic means includes a test-and-reset circuit.

10. The mechanism of claim 9 wherein said set-and-reset circuit utilizes said light-emitting diode.

11. A device for a radiographic cassette comprising
 a light sensor,
 electronic means including a photodetector,
 a conduit for conveying light energy sensed by said light sensor to said photodetector that converts such energy into an electrical current,
 said electronic means responsive to such electrical current for indicating an exposure of an X-ray film or the like in the cassette,
 said electronic means including detecting, amplifying, oscillating, and latching circuits, and a test-and-reset circuit operatively connected to the oscillating circuit.

12. The device of calim 11 wherein said conduit comprises a bundle of optical fibers.

13. The device of claim 11 wherein said oscillating circuit includes
a light-emitting diode, said latching circuit latching onto said oscillating circuit to make said diode blinkingly flash to thereby indicate such exposure.

14. The device of claim 13 wherein said test-and-reset circuit utilizes said diode to test the operational status of the device.

15. The device of claim 11 wherein said electronic means includes a first switch for making operational said device, said test-and-reset circuit comprising a second switch for energizing an oscillator in said oscillating circuit.

16. A radiographic cassette including a device for indicating exposure of a radiographic film or the like in the cassette,
said device comprising
means mounted in the cassette for transmuting the radiation of a pulse of an X-ray beam or the like into light energy,
means for converting such light energy into an electrical current,
means for conveying such light energy from said transmuting means to said converting means, and
electronic means actuated by said converting means for indicating such exposure,
said electronic means including means for testing the operational status of the electronic means.

17. The cassette of claim 16 wherein said converting means comprises a photodetector and said electronic means comprises
a) detector and amplifying means for the electrical current,
b) a light-emitting diode for indicating exposure of the film or the like, and
c) latching means by which said light-emitting diode continues to be activated.

18. The cassette of claim 17 wherein said conveying means comprises a conduit.

19. The cassette of claim 18 wherein said conduit comprises a bundle of optical fibers connecting said transmitting means to said photodetector.

20. The cassette of claim 16 wherein said light-emitting diode tests the operational status of the device as well.

21. The cassette of claim 16 wherein said transmuting means comprises a sensor.

22. The cassette of claim 21 wherein said sensor comprises a phosphor material.

23. The cassette of claim 22 wherein said conveying means comprises a conduit.

24. The cassette of claim 23 wherein said conduit comprises a bundle of optical fibers connecting said transmuting means to said photodetector.

* * * * *

UNITED STATES PATENT AND TRADEMARK OFFICE
CERTIFICATE OF CORRECTION

PATENT NO. : 5,282,236
DATED : Jan. 25, 1994
INVENTOR(S) : HAYES, Dennis D and WELCOME, Warren W It is certified that error appears in the above-identified patent and that said Letters Patent is hereby corrected as shown below:

In column 10, line 52, "cassette" should read as
－－ mechanism －－.

In column 11, line 3, "calim" should read as －－ claim －－.

Signed and Sealed this

Thirtieth Day of August, 1994

Attest:

BRUCE LEHMAN

Attesting Officer      Commissioner of Patents and Trademarks